UNITED STATES PATENT OFFICE.

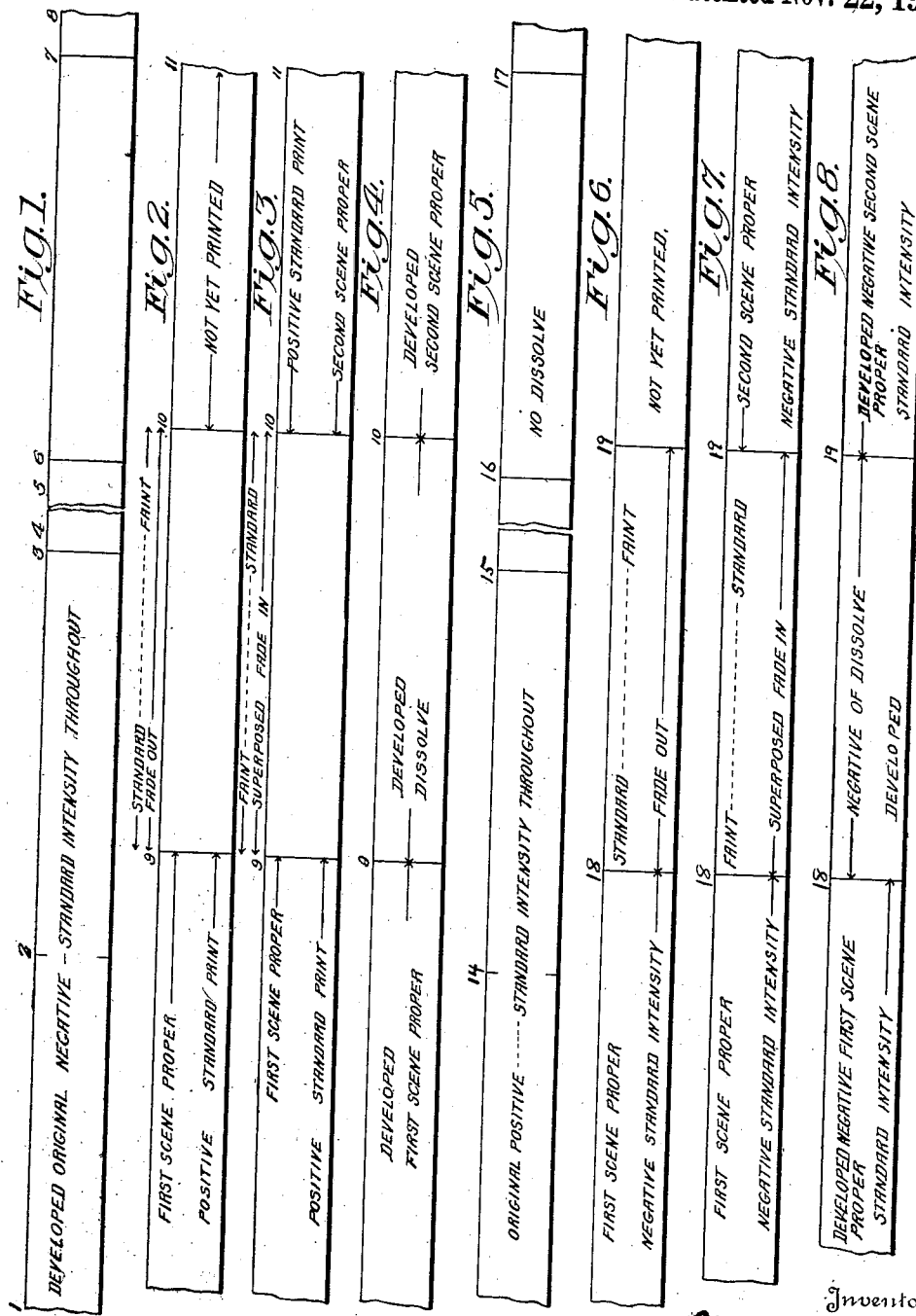
W. O. OWEN.
PRODUCTION OF "DISSOLVE" EFFECTS IN MOVING PICTURE FILMS.
APPLICATION FILED OCT. 12, 1920.
1,397,600.
Patented Nov. 22, 1921.

WILLIAM O. OWEN, OF WASHINGTON, DISTRICT OF COLUMBIA.

PRODUCTION OF "DISSOLVE" EFFECTS IN MOVING-PICTURE FILMS.

1,397,600. Specification of Letters Patent. Patented Nov. 22, 1921.

Application filed October 12, 1920. Serial No. 416,429.

*To all whom it may concern:*

Be it known that I, WILLIAM O. OWEN, a citizen of the United States, residing at Washington, District of Columbia, have invented certain new and useful Improvements in the Production of "Dissolve" Effects in Moving-Picture Films, of which the following is a specification.

The present invention relates to producing motion picture films having a "dissolve" effect between two successive scenes, this effect being produced in the present invention, in the printing operation.

A "dissolve" effect between two successive scenes of a moving picture film whereby one scene gradually merges into another scene are at the present time ordinarily produced in a more or less complicated manner, in the taking of the negative, the usual practice being to produce what is known as a "fade out", i. e., to gradually cut off the view from the camera, by a suitable shutter, at the end of the scene, and to produce a "fade in", i. e., to gradually let on the view by a shutter to the camera at the commencement of the following scene, superimposed exposed on the "fade out", after which the printing is conducted in the usual or regular manner. This entails considerable difficulties. In the taking of such a negative a considerable amount of technique on the part of the operator is required, and if anything goes wrong either during the gradual closing of the shutter at the end of the first scene, or during the gradual opening of the shutter at the beginning of the second scene the "dissolve" is spoiled.

In accordance with the present invention, I take the pictures as if no "dissolve" were to be produced, that is to say, without modifying the condition of the shutter at the commencement or end of the respective scenes, whereby the several negative photographs are made of substantially equal intensity, and the "dissolve" effect is thereafter produced in the printing operation by the two steps hereinafter designated as A and B, respectively.

Step A consists essentially in producing an artificial "fade out", by printing from the last few photographs of substantially equal intensity of that portion of the negative which is to constitute the first of two successive scenes, a series of prints, these prints being of successively lower and lower intensity, (by successively decreasing the light during the printing operation) until the last of said prints is extremely dim, and will accordingly constitute practically no print at all. This can be readily done in the printing operation, by gradually reducing the amount of light with which the printing is done, for instance by gradually cutting in adjustable resistance placed in series with the lamp which furnishes the light for such printing operation.

In this operation there may be used, for example, about four feet of film (or any other desired amount). During the time of printing from such portion of film, the light is gradually turned down or dimmed from full light (such as is required for producing a standard print from the negative) to such an amount of light as will produce substantially no effect or very little effect upon the positive. This constitutes an artificial "fade out" effect. Of course in such printing operation it is advisable to suitably mark the portion of the positive film corresponding to the beginning and the ending of this "fade out".

Step B: Upon the same portion of the positive film as was used for printing the "fade out" in step A (or which is to be subsequently used for this purpose) I print a succession of photographs from the first portion of that section of the negative film which is to constitute the negative of the second of the said two scenes, such printing being very light (almost or quite invisible) at the commencement, and of full or substantially full intensity at the end of said succession. This obviously can be done by gradually turning on the light with which the printing is to be effected, for example, by slowly removing the resistance from the circuit, until the standard light (or substantially standard light) is given. During this operation, the same number of pictures may be and preferably are printed, as in step A, viz., four feet of film, for example.

In making the succesion of prints of successively lower intensity it is advisable to cut off a fixed portion of the light from each print, for example, assuming that four feet of film are to be used in producing the "dissolve", containing sixty-four pictures, one sixty-fourth of the light may be cut off after printing each picture, and before the next picture is printed. In step B, the light is increased in the same proportion. In this manner the two successive printings upon any given portion of the positive may constitute, if added together, about the amount of printing which would constitute a standard print.

The use of adjustable resistance in the circuit operating the electric lamp for the printing is given as an example of a convenient mode of effecting the series of printings of successively lower or greater intensity. It is to be understood that various other modes of accomplishing this result can be employed, mechanical, etc.

The remainder of the first scene and of the second scene are of course either previously or subsequently printed in the ordinary manner and of standard intensity. The negative is finally developed, fixed and dried in the ordinary or any approved manner.

The order of steps A and B is immaterial, either the fade out forming the ending of the first of the two scenes being printed first, or the fade in forming the commencement of the second of the two scenes printed first. It will be obvious that the margin lines of the successive pictures ("frames") produced in step A should be coincident or substantially coincident with the margin lines of the successive pictures printed in step B.

I am of course aware that heretofore, in the printing of moving picture films, the intensity of the light has been varied, depending upon the denseness of the negative from which the print is being made, but the aim in all cases has been to produce in the printing what might be termed a "standard" print on the positive.

While I have above referred to printing from negative films upon positive films, it is obvious that the procedure is applicable also in other instances, where films as such are not used, but plates, disks and the like.

I have above referred to the "first scene" and "second scene," these terms being intended to be applied to the first of two successive scenes, and to the second of such two successive scenes (as finally appearing on the finished positive film) between which the "dissolve" effect is to be produced. These may be successive on the negative, or not, as desired.

A valuable feature of the present invention consists therein, that any desired two points in the negative representing a particular scene can be selected as the commencement and end, respectively, of that particular scene. In this way it is possible to utilize the negative for a portion of a scene, even although the entire scene did not turn out as originally anticipated, as for example, where mistakes were made by one or more of the actors during some part of the scene. Another valuable feature is that the services of a highly skilled camera operator, heretofore usually required in the production of the "fade in" and "fade out," are not required in the use of the present invention.

The first positive, made as above described, may be used as a master positive, from which to print a number of negatives for subsequently printing copies (positives) for use in projection, etc.

A modified form of execution would consist in printing from the original negatives (or from copies thereof) standard intensity positives, and thereafter "fading out" from one portion of such a positive on to a negative, and "fading in" from another portion of such a positive, on to the same portion of such negative, then developing such negative, and printing positives therefrom.

Figure 1 shows either one film or two films, the irregular lines representing places where the view is broken. Fig. 1 represents an ordinary developed negative and from some place to the left of the numeral 1 up to the numeral 2 represents the first of two successive scenes, and the portion from 2 to 3 represents that portion of the original negative which may be used for making the fade out at the end of the first scene (e. g. four feet). The length from 6 to 7 is to indicate the same length of film as from 2 to 3 (e. g. four feet) which length of film is to be used for making the fade in, and the part from 7 on toward the right, e. g., to some place beyond 8, will constitute the second of the two scenes in question. The line 6 may be the same as the line 3 or it may be at a point far away from this point 3 if desired, or it may be on some entirely separate film.

Fig. 2 represents the product of the first step of the process, namely, the first scene proper, up to the line 9 has been printed of standard intensity from the film 1—2, and the part 9—10 constitutes the fade out, this printing being of standard intensity or substantially standard intensity at the point 9, and being so faint as to be practically no print at the line 10. This is made from the part 2—3 of Fig. 1. The part of the film from 10 to 11 and onward has not been printed.

Fig. 3 represents the result of the second step. Upon the fade out 9—10 of Fig. 2 (without developing the fade out) has been printed, very faint at the beginning 9, and of standard intensity at the end 10, a series of prints from the portion of the negative 6—7 above referred to and from 10 to 11 and onward, has been printed the second scene proper, this latter being of standard intensity.

Fig. 4 represents the product produced by developing the product shown in Fig. 3, namely, there is a first scene proper up to 9, a dissolve from 9 to 10 and a second scene proper from 10 onward.

Figs. 5, 6, 7 and 8 show in the same manner the different stages in the modified form of procedure shown.

Fig. 5 shows an ordinary developed positive, of standard intensity throughout. This carries no dissolve and no fade out or fade in.

The part 14—15 is selected to form the fade out of the first scene, and the part 16—17 is selected to form the fade in of the second scene.

Fig. 6 represents the product of the first step, namely, the part 18—19 is printed from the part 14—15, the part near 18 being of standard intensity and the part near 19 being printed so faint as to be negligible. The first scene proper, to the left of 18 has already been printed, of standard intensity throughout. The part to the right of 19 has not yet been printed.

Fig. 7 shows what modification of Fig. 6 is produced in the second step. A fade in is printed, (superposed on the fade out 18—19) from the part 16—17 of the film of Fig. 5. In this printing, the part near 17 is printed with full light (or substantially full light), to produce approximately standard print near 19. The part near 16 is printed on the part near 18, with very little light, so as to produce only a very slight printing effect. The part of the film from 19 on to the right, is then used for printing the second of the two scenes, printing of standard intensity being effected.

The structure represented in Fig. 7 is then developed, thereby producing the product illustrated in Fig. 8, viz, a developed negative, constituting three portions, a first scene up to the point 18, a dissolve 18 to 19 and a second scene from 19 toward the right.

I claim:

1. A process of making a "dissolve" between two successive scenes of a moving picture film, which comprises printing from the last few photographs of that portion of a moving picture film which corresponds to a given scene, such photographs being of approximately equal intensity, a succession of prints upon a moving picture film, such succession of prints being of successively lower intensity, such successively lower intensity being produced by gradually reducing the light admitted to such printing operation, also printing upon the said portion of such second-mentioned film from the first few photographs of that portion of a moving picture film which corresponds to the commencement of the succeeding scene, such photographs also being of approximately equal intensity, a succession of prints of successively greater intensity, such successively greater intensity being produced by gradually increasing the light admitted to such printing operation, the margins of the two sets of prints being substantially coincident, and thereafter developing the said second-mentioned film.

2. A process of making a positive picture film having a "dissolve" between two successive scenes, which comprises exposing the negative film as if no "dissolve" effect were to be made, developing the negative, thereafter printing from the latter portion of that section of a resulting film of substantially standard intensity which corresponds to a given scene of the finished picture, a succession of prints upon a given portion of a film, such succession of prints being of gradually and successively decreasing intensity, such successively lower intensity being produced by gradually reducing the light admitted to such printing operation, also printing upon same portion of last-mentioned film, from the first portion of that section of a resulting film of substantially standard intensity which corresponds to the next succeeding scene of the picture, a succession of prints, such last-mentioned succession of prints being of gradually and successively increasing intensity, such successively greater intensity being produced by gradually increasing the light admitted to such printing operation and thereafter developing the printed film.

3. A process of making a positive motion picture film having a "dissolve" between two successive scenes, which comprises exposing the negative film for such two scenes, as if no fade effects were to be made, thereafter printing from the latter portion of that section of the negative film which corresponds to a given scene of the finished picture, a succession of prints upon a given portion of a positive film, such succession of prints being of gradually and successively decreasing intensity, the first of such succession of prints being of approximately standard intensity, and the last of such succession of prints being so faint as to be substantially negligible, also printing upon such portion of positive film, from the first portion of that section of the negative film which corresponds to the next succeeding scene of the finished picture, a succession of prints, such last-mentioned succession of prints being of gradually and successively increasing intensity, starting with a print which is so light as to be substantially negligible and finishing with a print which is of substantially standard intensity, by varying the amount of light admitted to both of said printing operations, and thereafter developing the printed positive.

4. In the production of "dissolve" effects in printing a moving picture film, the steps of printing from the portion of a developed film corresponding to the latter portion of that section of a film which corresponds to a given scene of the finished picture, a succession of prints upon a given portion of a film, such succession of prints being of successively decreasing intensity, by successively decreasing the amount of light reaching the developed film during such printing operation, also printing upon same portion of such second-mentioned film, from the first portion of that section of a developed film which corresponds to the next succeeding scene of the finished picture, a succession of prints, such last-mentioned succession of prints being of successively increasing intensity, by successively increasing the amount of light reaching the developed film during such second printing operation, such two printing operations being performed in any desired order.

5. The process of producing a "dissolve" effect from one scene into another scene, by reducing in a gradual way the light reaching the film during the printing operation, by reducing the light a given fraction of the whole in each picture from full printing density of light to such an amount of light as will produce substantially no effect, and also "fading in" by increasing in a gradual way the light reaching the film during the printing operation from such an amount of light is will produce substantially no effect to substantially full printing intensity of light, thus dissolving one scene into the next.

6. A process of producing a fade, which comprises the step, in the printing operation, in which light passes through the successive frames of a developed moving picture film onto a sensitized film, of successively and gradually changing the amount of light supplied to said developed film, between two limits, one of said limits representing such an amount of light as will produce substantially standard intensity printing, and the other of said limits representing such an amount of light as will produce such a small amount of printing as to be negligible.

In testimony whereof I affix my signature.

WILLIAM O. OWEN.